US009121743B2

(12) United States Patent
Sofen et al.

(10) Patent No.: US 9,121,743 B2
(45) Date of Patent: Sep. 1, 2015

(54) PROCESS VARIABLE TRANSMITTER SYSTEM WITH ANALOG COMMUNICATION

(75) Inventors: Brian Edward Sofen, Minneapolis, MN (US); Richard L. Nelson, Chanhassen, MN (US)

(73) Assignee: Rosemount Inc., Chanhassen, MN (US)

( * ) Notice: Subject to any disclaimer, the term of this patent is extended or adjusted under 35 U.S.C. 154(b) by 655 days.

(21) Appl. No.: 13/484,920

(22) Filed: May 31, 2012

(65) Prior Publication Data

US 2013/0325369 A1 Dec. 5, 2013

(51) Int. Cl.
*G01F 23/14* (2006.01)
*G06F 17/40* (2006.01)
(Continued)

(52) U.S. Cl.
CPC ............ *G01F 23/14* (2013.01); *G01F 23/0084* (2013.01); *G01F 23/18* (2013.01); *G06F 17/40* (2013.01); *G06F 19/00* (2013.01)

(58) Field of Classification Search
CPC ........... G01D 3/00; G01D 3/028; G01D 7/00; G01D 9/00; G01D 21/00; G01F 1/00; G01F 1/05; G01F 1/34; G01F 1/50; G01F 23/00; G01F 23/0061; G01F 23/0084; G01F 23/147; G01F 23/18; G01L 13/00; G01L 13/06; G01L 19/00; G01L 19/08; G01L 19/083; G06F 11/00; G06F 11/30; G06F 11/32; G06F 11/34; G06F 15/00; G06F 15/16; G06F 17/00; G06F 17/10; G06F 17/40; G06F 19/00; G08C 19/00; G08C 19/02
USPC ......... 73/290 R, 291, 432.1, 700, 753, 865.8, 73/865.9, 866.3; 137/551, 558; 340/500, 340/540, 603, 612, 614, 618, 870.01, 340/870.07, 870.16; 702/1, 33, 50, 52, 55, 702/127, 138, 140, 187, 189; 708/100, 105, 708/200
See application file for complete search history.

(56) References Cited

U.S. PATENT DOCUMENTS

| 2,142,677 A | 1/1939 | Parker |
| 2,705,747 A | 4/1955 | Strange |

(Continued)

FOREIGN PATENT DOCUMENTS

| CN | 1062660 C | 2/2001 |
| CN | 102331281 A | 1/2012 |

(Continued)

OTHER PUBLICATIONS

International Search Report and Written Opinion dated Jul. 18, 2013 for International Appln. No. PCT/US2013/037535, filed Apr. 22, 2013, 10 pgs.

(Continued)

*Primary Examiner* — Edward Cosimano
(74) *Attorney, Agent, or Firm* — Westman, Champlin & Koehler, P.A.

(57) ABSTRACT

A process variable transmitter system for sensing a first pressure at a first location and second pressure at a second location, includes a first transmitter having a first pressure sensor configured to sense the first pressure and first analog output stage coupled to the first sensor configured to provide an analog output signal related to the first pressure. A second pressure transmitter includes a second pressure sensor configured to sense the second pressure and spaced apart from the first pressure sensor. A second analog output stage provides an analog output related to the second pressure. An analog processing stage provides a processed output related to the first and second pressures. A two-wire output is configured to provide an analog current output on a two-wire process variable loop based upon the processed output.

20 Claims, 3 Drawing Sheets

(51) Int. Cl.
  *G06F 19/00* (2011.01)
  *G01F 23/00* (2006.01)
  *G01F 23/18* (2006.01)

(56) References Cited

U.S. PATENT DOCUMENTS

| | | | |
|---|---|---|---|
| 2,883,255 A * | 4/1959 | Anderson | 346/34 |
| 3,061,806 A | 10/1962 | Stevens | |
| 3,488,996 A | 1/1970 | Pfrehm | |
| 3,701,280 A | 10/1972 | Stroman | |
| 4,238,825 A | 12/1980 | Geery | |
| 4,250,490 A | 2/1981 | Dahlke | 340/870.37 |
| 4,414,634 A | 11/1983 | Louis et al. | |
| 4,419,898 A | 12/1983 | Zanker et al. | |
| 4,446,730 A | 5/1984 | Smith | |
| 4,485,673 A | 12/1984 | Stern | |
| 4,520,488 A * | 5/1985 | Houvig et al. | 375/216 |
| 4,528,855 A | 7/1985 | Singh | |
| 4,562,744 A | 1/1986 | Hall et al. | |
| 4,598,381 A | 7/1986 | Cucci | |
| 4,602,344 A | 7/1986 | Ferretti et al. | |
| 4,677,841 A | 7/1987 | Kennedy | |
| 4,825,704 A | 5/1989 | Aoshima et al. | |
| 4,881,412 A | 11/1989 | Northedge | |
| 4,958,938 A | 9/1990 | Schwartz et al. | |
| 5,035,140 A | 7/1991 | Daniels et al. | |
| 5,058,437 A | 10/1991 | Cahumont et al. | |
| 5,606,513 A * | 2/1997 | Louwagie et al. | 702/138 |
| 5,665,899 A * | 9/1997 | Willcox | 73/1.63 |
| 5,870,695 A | 2/1999 | Brown et al. | |
| 5,899,962 A | 5/1999 | Louwagie et al. | |
| 6,059,225 A | 5/2000 | Vidal et al. | 244/17.13 |
| 8,812,253 B2 | 8/2014 | Davis et al. | 702/45 |
| 2013/0325369 A1 | 12/2013 | Sofen et al. | 702/50 |

FOREIGN PATENT DOCUMENTS

| | | |
|---|---|---|
| CN | 202903415 U | 4/2013 |
| DE | 9109176 | 9/1991 |
| EP | 0063685 | 3/1982 |
| EP | 0214801 | 3/1987 |
| EP | 0223300 | 5/1987 |
| EP | 0 870 675 A1 | 10/1998 |
| JP | 2005-69705 | 3/2005 |
| WO | 88/01417 | 2/1988 |
| WO | 89/02578 | 3/1989 |
| WO | 8904089 | 5/1989 |
| WO | 9015975 | 12/1990 |
| WO | 9118266 | 11/1991 |

OTHER PUBLICATIONS

Brochure: "Reduce Unaccounted-For Natural Gas with High-Accuracy Pressure Transmitters," Rosemount Inc. Measurement Division, Eden Prairie, Minnesota, ADS 3073, May 1991, pp. 1-4.

Technical Information Bulletin, "Liquid Level Transmitter Model DB40RL Sanitary Sensor deltapilot," Endress&Hauser, Greenwood, Indiana, Sep. 1992, pp. 1-8.

"The Digitisation of Field Instruments," Van Der Bijil, Journal A, V. 32, N. 3, pp. 62-65, 1991.

"Single Chip Senses Pressure and Temperature," Machine Design, 64, No. 10, May 21, 1992.

Specification Summary, "Teletrans 3508-30A Smart Differential Pressure Transmitter," (undated) Bristol Babcock, Inc. Watertown, CT, 06795.

Specification Summary, "Teletrans 3508-10A Smart Differential Pressure Transmitter," (Undated), Bristol Babcock, Inc. Watertown, CT 06795.

Specification Summary, "AccuRate Advanced Gas Flow Computer, Model GFC 3308," (undated) Bristol Babcock, Inc. Watertown, CT 06795.

Product Data Sheet 4640, "Model 3201 Hydrostatic Interface Unit," Mar. 1992, Rosemount Inc. Eden Prairie, MN 55344.

Product Data Sheet 4638, "Model 3001CL Flush-Mount Hydrostatic Pressure Transmitter," Jul. 1992, Rosemount Inc. Eden Prairie MN 55344.

"Flow Measurement," Handbook of Fluid Dynamics, V. Streeter, Editor-in-chief, published by McGraw-Hill Book Company, Inc. 1961, pp. 14-1 to 14-15.

"Precise Computerized In-Line Compressible Flow Metering," Flow—Its Measurement and Control in Science and Industry, vol. 1, Part 2, Edited by R. Wendt, Jr. Published by American Institute of Physics et al. (undated) pp. 539-540.

"Mass-Flow Meter," Dr. C. Ikoku, Natural Gas Engineering, PennWell Books, (Undated), pp. 256-257.

"Hydrostatic Tank Gauging—Technology Whose Time Has Come," J. Berto, Rosemount Measurement Division Product Feature, undated reprint from Intech.

"Pressure Sensors Gauge Tank Level and Fluid Density," Rosemount Measurement Division Product Feature, undated reprint from Prepared Foods (Copyrighted 1991 by Gorman Publishing Company).

"Low Cost Electronic Flow Measurement System," Tech Profile, May 1993, Gas Research Institute, Chicago, IL.

"Development of an Integrated EFM Device for Orifice Meter Custody Transfer Applications," S.D. Nieberle et al., American Gas Association Distribution/Transmission Conference & Exhibit, May 19, 1993.

Advertisement, Accurate Model 3008 Integral Smart DP/P/T Transmitter, (undated), Bristol Babcock, Inc. Watertown, CT 06795.

Advertisement, Model 3508 DP Transmitter, Control Engineering, Dec. 1992, Bristol Babcock Inc. Watertown, CT 06795.

"Smart Transmitters Tear Up the Market," C. Polsonetti, Intech, Jul. 1993, pp. 42-45.

Office Action from Chinese Patent Application No. 201210380166.1, dated Dec. 1, 2014.

Office Action from European Patent Application No. 13720669.4, dated Jan. 12, 2015.

Satron VDU, Differential Pressure Transmitter Using Two Separate Pressure Sensors, "Installation and Setting-Up Instructions Spare Parts List", BPDUV760AV, Man.rev. 1, dated Aug. 31, 2007.

Satron VDU, Differential Pressure Transmitter Using Two Separate Pressure Sensors, "Technical Specifications", BPDUV760, dated Aug. 31, 2009.

VDU Differential Pressure Transmitter, satron.com/products.asp?sua=2&lang=3&s=37&q=y>, dated Oct. 27, 2011.

Pressure Seals Diminish in Differential Pressure Measurement, satron.com/tmp_satron_site_2.asp?sua=2&lang=3&s=8 . . . , dated Oct. 27, 2011.

Yong Mui Wong et al. "Characterization and CMRR Modeling of a Carbon-Nanotube Field-Emission Differential Amplifier," IEEE Transactions on Electron Devices, IEEE Devices, IEEE Service Center, Piscataway, NJ, v. 56, No. 5, May 1, 2009, pp. 738-743.

Methods for Volume Measurement Using Tank-Gauging Devices Can Be Error Prone, F. Berto, The Advantages of Hydrostatic Tank Gauging Systems, undated reprint from Oil & Gas Journal.

* cited by examiner

PROCESS VARIABLE TRANSMITTER SYSTEM WITH ANALOG COMMUNICATION

BACKGROUND

The present invention relates to process variable transmitters of the type used to sense a process variable in an industrial process. More specifically, the present invention relates to process variable transmitters used to sense a remote pressure of a process fluid of an industrial process.

Process variable transmitters are used in industrial processes to sense process variables. Examples of process variables include temperature, flow rate, pressure, etc. The process variable transmitter senses a process variable and transmits information related to the process variable to a centralized location, for example, a central process control room. The sensed process variable can be used to monitor operation of the process and, in some instances, can be used to control operation of the process. Various techniques are used for the transmission of the process variable including both wired and wireless techniques. One well known wired technique is a two-wire process control loop in which an analog current level is used to represent the process variable. For example, a 4 mA current level can represent a low value of a process variable and a 20 mA current level can represent a high value. The same two-wire process control loop can also be used to power the process variable transmitter.

One type of process variable transmitter is used to sense level of a process fluid in a tank or container. U.S. Pat. No. 5,899,962, issued May 4, 1999, entitled "DIFFERENTIAL PRESSURE MEASUREMENT ARRANGEMENT UTILIZING DUAL TRANSMITTERS," and assigned to Rosemount Inc. shows one example of such a configuration and is incorporated herein by reference in its entirety. For example, a process variable transmitter can use two pressure sensors which are vertically spaced apart. A differential pressure between the two sensors can be used as an indication of the amount of process fluid contained in the container. In one configuration, the process pressures are physically coupled to a differential pressure sensor in the process variable transmitter which is used to measure the differential pressure. However, this requires a mechanical coupling through a conduit or "fill tube" which can lead to inaccuracies and also may require relatively large openings ("penetrations") through walls and the like for the conduit. Further, the use of a mechanical coupling of the two pressures to a differential pressure sensor can introduce errors into the pressure measurement, for example, due to temperature variations. In another configuration, such as that set forth in U.S. Pat. No. 5,899,962, the two pressures are measured separately, and electronically communicated to circuitry which calculates the differential pressure. However, in some environments, it is not possible to use digital circuitry, for example in nuclear power plant applications. The harsh radiation environment may damage such circuitry.

SUMMARY

A process variable transmitter system for sensing a first pressure at a first location and second pressure at a second location, includes a first transmitter having a first pressure sensor configured to sense the first pressure and first analog output stage coupled to the first sensor configured to provide an analog output signal related to the first pressure. A second pressure transmitter includes a second pressure sensor configured to sense the second pressure and spaced apart from the first pressure sensor. A second analog output stage provides an analog output related to the second pressure. An analog processing stage provides a processed output related to the first and second pressures. A two-wire output is configured to provide an analog current output on a two-wire process variable loop based upon the processed output.

DETAILED DESCRIPTION OF ILLUSTRATIVE EMBODIMENTS

The present invention provides a method and apparatus for measuring pressure of a process fluid at a remote location. This can be used to determine level of a liquid in a tank using two process variable transmitters configured to sense two pressures. In such a configuration, a first pressure is conveyed from a slave transmitter to a master transmitter. The master transmitter also measures a second pressure and is configured to provide an output on a two-wire process control loop which is related to a difference between the first and second pressures. The transmitters can also be powered with power received from the two-wire process control loop. The transmitters preferably operate using analog circuitry. This overcomes problems associated with the use of digital circuitry. Further, this configuration does not require the relatively large size openings through walls (such as a containment wall in a nuclear power plant) and the like required in a remote seal system which uses conduits for the pressure couplings and is also not susceptible to errors due to temperature variations of the conduit.

Figure 1:
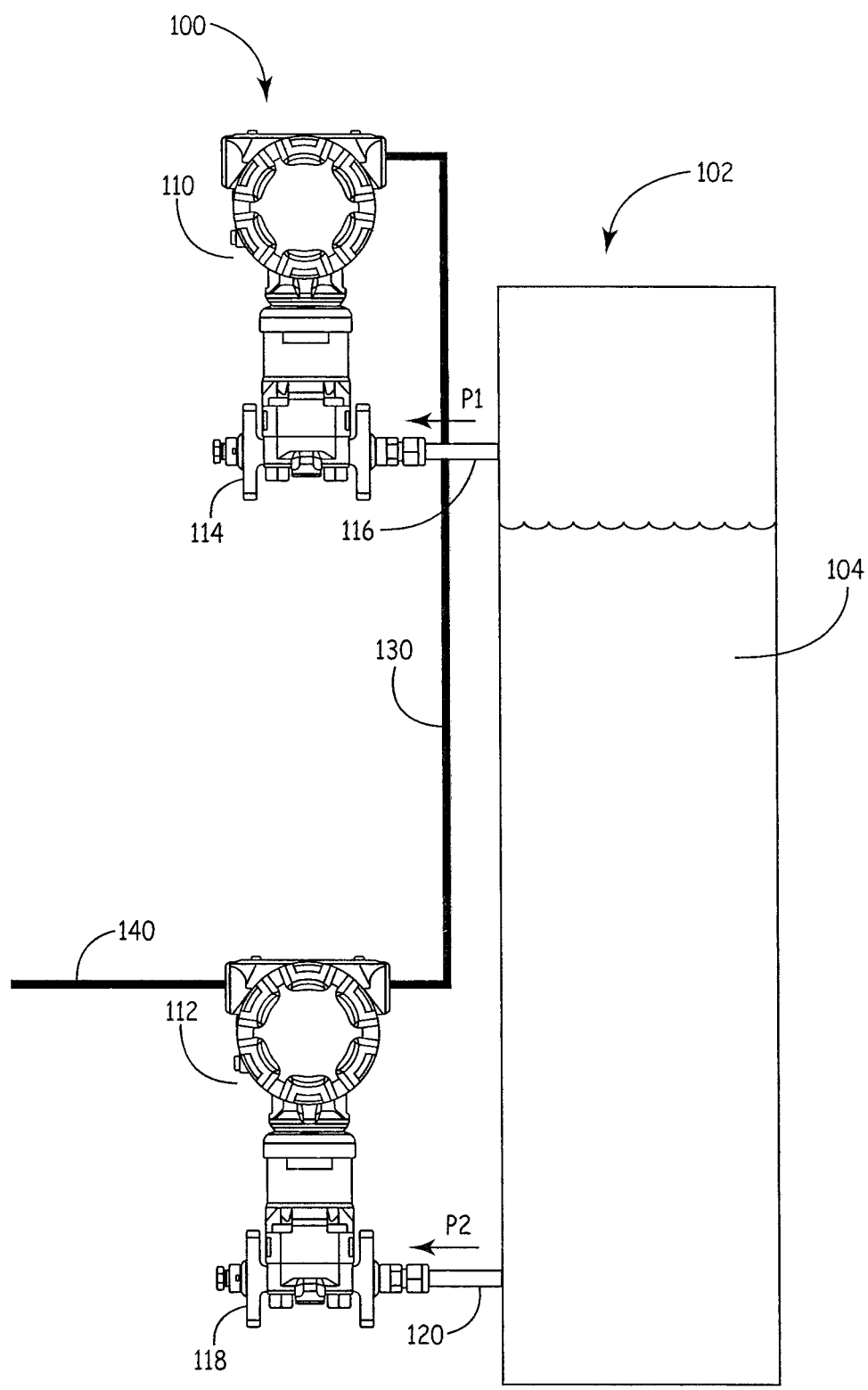
FIG. 1 is a simplified block diagram of an industrial process including transmitters arranged to sense a differential pressure of a process fluid in a tank or container.

FIG. 1 is a simplified block diagram of one embodiment showing an industrial process 100 including a tank or container 102 filled with a process fluid. Process variable transmitters 110 and 112 are arranged to measure a level of the process fluid 104 within the tank 102. Process variable transmitter 110 couples to a pressure P1 through pressure coupling 116 and manifold 114. Similarly, process variable transmitter 112 couples to tank 102 through pressure coupling 120 and manifold 118 to measure a second pressure P2. An analog signal related to the sensed pressure P1 is communicated from transmitter 110 to transmitter 112 through wiring 130 as explained below in greater detail. Based upon a difference between the pressures P1 and P2, transmitter 112 provides an output on 4-20 mA process control loop 140. The output is an analog current value. For example, a 4 mA signal can indicate a low or minimum value and a 20 mA signal can indicate a high or maximum value.

Some prior art techniques have used a single transmitter to measure the pressure difference between pressures P1 and P2. In one such configuration, remote pressure diaphragm seals and accompanying conduits extend from the locations of pressures P1 and P2 to inlets at a pressure transmitter. One or more pressures sensors within the pressure transmitter can then be used to measure the pressure applied through the two conduits. However, this configuration may introduce errors into the pressure measurements, for example, due to temperature variations. Further, the conduits require relatively large openings in order to pass through walls or the like or may require multiple openings for multiple conduits. One way to avoid the use of pressure conduits is to use a digital communication technique to transmit the pressure sensed at one location to another location for use in determining the differential pressure. However, there are instances in which digital circuitry cannot be used, such as in a location which experiences high levels of radiation. Therefore, in one aspect, the present invention provides a technique using analog circuitry and analog signaling techniques to communicate a first pressure to a transmitter for use in determining differential pressure. The present invention does not require the large openings for wall penetration needed by remote seal configurations which use a mechanical couple such as capillary tubes to communicate pressures between locations. Further, errors that may arise due to temperature variations of the capillary tubes are eliminated. The present system only requires one small wall penetration for the twisted pair wire and this single twisted wire pair operating a 4-20 mA loop can be used to power both transmitters.

Figure 2:
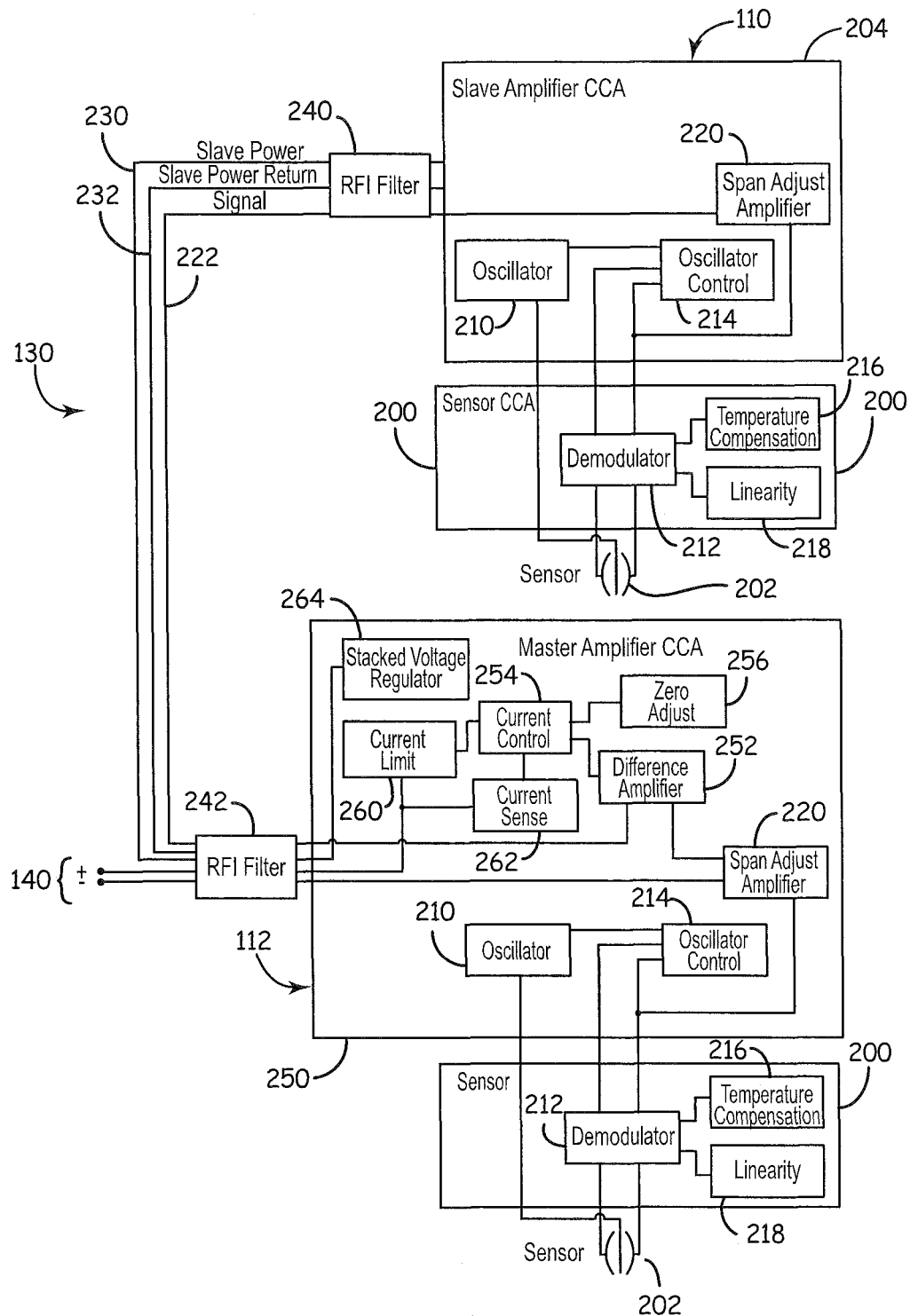
FIG. 2 is a simplified block diagram of a pressure transmitter shown in FIG. 1.

FIG. 2 is a simplified block diagram of pressure transmitters 110 and 112. As illustrated in the embodiment of FIG. 2, process variable transmitter 110 includes a pressure sensor module 200 coupled to a pressure sensor 202 in an electronics module 204. In the illustrated configuration, the pressure sensor 202 is a capacitive based pressure sensor in which a capacitance of the sensor varies with applied pressure. The capacitance can be measured by using various techniques, such as a sigma/delta converter. An AC signal from an oscillator 210 is applied to capacitive plates of the pressure sensor 202. A resultant signal is generated and demodulated by a demodulator 212 which is used as feedback provided to an oscillator control circuit 214. This feedback signal is related to the applied pressure. Further, the demodulated output is compensated based upon temperature using temperature compensation circuitry 216 and compensated to non-linearites in the measurements using linearity circuitry 218. In one particular configuration, a current level is provided to span adjustment amplifier 220 which is related to the sensed pressure. For example, the current can vary between 0 and 82 µA. The span adjustment amplifier 220 generates an analog output signal 222 which is a voltage level related to the sensed pressure. In one specific embodiment, the voltage level varies between 1 and 5 volts. In addition to the analog output signal 222, wiring 130 includes a slave power wire 230 and a slave power return wire 232. In one configuration, these are 10 volt and 5.1 volt supply voltages, respectively, and their operation is described below in greater detail. Although three connections are shown, the invention is not limited to this configuration and any number of power and signal connections can be used, including configurations in which a connection carries power as well as an analog signal related to sensed pressure. Thus, power for both transmitters 110,112 is delivered by loop 140. In another example configuration, one of the transmitters 110,112 includes an internal power source such as a battery. The internal power sources can be used to power bother transmitters. In another example configuration, both transmitters 110,112 include internal power sources. In another example, an external power source other than loop 140 is used to power the transmitters 110,112. Power saving can be achieved by removing power from the slave transmitter 110 during periods of non-use.

The embodiment of FIG. 2 also illustrates a block diagram of master process variable transmitter 112. Similar components in the master process variable transmitter 112 have similar numbering with respect to process variable transmitter 110. Transmitter 112 includes a similar sensor module 200 coupled to a pressure sensor 202 having demodulator 212, temperature compensation circuitry 216 and linearity circuitry 218. The electronics module 250 of transmitter 112 includes an oscillator 210, oscillator control circuitry 214 and span adjustment amplifier 220. Additionally, a difference amplifier 252 is configured to provide an output to current control circuitry 254 which is related to a difference between the voltage of analog output signal 222 and a voltage from the span adjustment amplifier 220 in transmitter 112. This voltage difference is representative of a pressure difference between the two pressure sensors and is indicative of the height of process fluid 104 in the container 102 illustrated in FIG. 1.

The current control circuit 254 provides an output on the two-wire process control loop 140 which is indicative of this pressure difference. For example, a 4 mA current level can represent a minimum pressure difference and a 20 mA current level can represent a maximum pressure difference. The pressure values can be linearly distributed over the span between 4 mA and 20 mA. Alternatively, a non-linear output can be provided. Zero adjust circuitry 256 is used to adjust the zero level of this current output. The maximum current provided on the two-wire loop 140 is limited by current limit circuit 260 and feedback is provided to the current control circuitry 254 using current sense circuit 262. A stacked voltage regulator 264 provides the voltage levels on slave power line 230 and slave power return line 232 of wiring 130. Additionally, FIG. 2 illustrates radio frequency interference (RFI) filters 240 and 242 which can be coupled to wiring 130 and to two-wire process control loop 140 in order to reduce any electrical interference entering transmitters 110 and 112.

Figure 3:
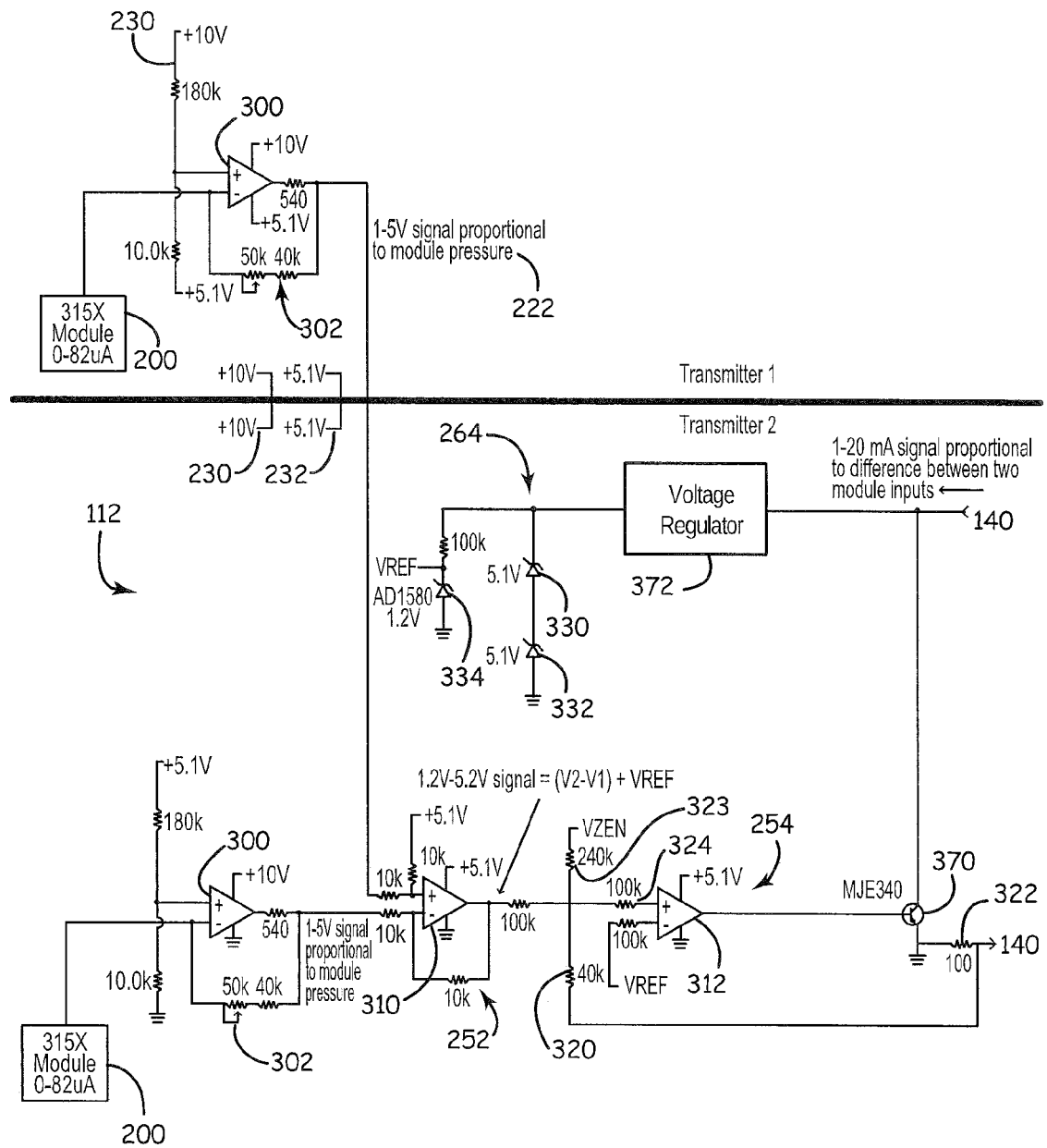
FIG. 3 is a simplified schematic diagram of portions of the pressure transmitter shown in FIG. 1.

FIG. 3 is a more detail schematic diagram showing circuitry of transmitters 110 and 112. In FIG. 3, the span adjustment amplifier 220 of transmitter 110 is illustrated as an operational amplifier 300 a voltage reference is provided to the operational amplifier between the +10 and +5.1 voltages of slave power 230 and slave power return 232, respectively. The output from the sensor module 200 is provided to the inverting input of the amplifier 300 whereby the output is a voltage related to the sensed pressure and varies between 1 and 5 volts. A span adjustment resistance 302 can be used to adjust the span of this voltage output. The span adjustment resistance 302 is arranged to provide negative feedback to the operational amplifier 300.

As illustrated in FIG. 3, transmitter 112 includes similar circuitry. The difference amplifier 252 is illustrated as an operational amplifier 310 which can be, for example, configured to provide a voltage output which varies 1.2 volts and 5.2 volts based upon a difference between the output from the span adjust amplifiers 220 of the transmitters 110 and 112. This signal is provided to the current control circuitry 254 which is illustrated as an operational amplifier 312. The gain of the amplifier 312 is determined by a ratio of a feedback resistor 320 with respect to a product of an output resistor 322 and a series resistor 324. A bias resistor 323 is arranged to determine the 4 mA point for the transmitter output. A zero adjustment potentiometer can also be utilized in order to allow adjustment of the zero point of the two-wire process control loop 140. The gain provided by amplifier 312 is based upon the values of resistors 320, 322 and 323. A current limiting resistance (not shown) can also be used to limit the current flowing through the two-wire process control loop 140. This current limiting resistance can be placed, for example, in series with output transistor 370. Note that this circuitry embodies the current sense 262, current control 254, current limit 260 and zero adjust 256 blocks illustrated in FIG. 2.

The stacked voltage regulator 264 is illustrated as zener diodes 330 and 332 which are arranged to generate the 5.1 volt and 10 volt supply voltages. A voltage reference VREF is generated using a zener diode 334. The diodes are powered using a voltage regulator 372. In one embodiment, the various components are of a radiation hard (RAD-hard) configuration thereby allowing the circuitry to operate in environments with high levels of radiation such as nuclear power plants. One example radiation hard op-amp is available from Harris and designated with part number HS2-3530ARH.

Although the present invention has been described with reference to preferred embodiments, workers skilled in the art will recognize that changes may be made in form and detail without departing from the spirit and scope of the invention. Although the above description describes only analog circuitry, it may be possible for other components of the transmitters to implement certain functions digitally using specialized electronics or components which are not critical to the operation of the system. With this present invention, a "remote seal" configuration is provided which does not require the use of any digital circuitry. Yet this implementation is provided without requiring the fluidic connection between the two transmitter units which is typical of prior art designs. This eliminates errors due to temperature variations of the conduit, and requires smaller size wall penetrations than a conduit. The particular circuitry illustrated herein is simply one preferred implementation of the invention and the invention is not limited to this configuration. In the embodiments shown, the two transmitters can be powered with power only received from the two-wire process control loop. However, in other implementations, a supplemental or other power source may be employed including a stand alone power source. In another example configuration, the two sensors are located remotely from one another and the analog sensor data is provided to a third location at which the differential pressure is calculated. In such a configuration, any one of the three devices may provide the coupling the two-wire process control loop and the same two-wire process control loop can be used to power the devices. As used herein, an analog output stage is circuitry used to provide an analog output representative of the output from a pressure sensor. An analog processing stage refers to analog circuitry used to process signals related to the outputs from the two pressure sensors and provide a processed output. The specific example used herein is a difference between the two values. Two wire output circuitry refers to the circuitry used to couple to the two-wire process control loop and control the level of current on the two-wire process control loop to represent a desired value. Although the circuitry used herein is described as being analog circuitry, in some embodiments, other circuitry may be implemented in the field devices in the form of digital circuitry.

What is claimed is:

1. A process variable transmitter system for sensing a first pressure at a first location and second pressure at a second location, comprising:
  a first process variable transmitter having:
    a first pressure sensor configured to sense the first pressure; and
    a first analog output stage coupled to the first sensor configured to provide a first analog output signal related to the first pressure;
  a second process variable transmitter having:
    a second pressure sensor configured to sense the second pressure, the second pressure sensor spaced apart from the first pressure sensor;
    a second analog output stage configured to provide a second analog output related to the second pressure;
    an analog processing stage configured to provide a processed output related to the first and second pressures; and
    a two-wire output circuitry configured to provide an analog current output on a two-wire process control loop based upon the processed output.

2. The process variable transmitter system of claim 1 wherein the analog output signals from the first and second analog output stages are voltage signals.

3. The process variable transmitter system of claim 1 wherein the first and second pressure sensors have a capacitance value related to applied pressure.

4. The process variable transmitter system of claim 1 wherein the circuitry of the first and second process variable transmitters comprises radiation hard circuitry.

5. The process variable transmitter system of claim 1 wherein the processed output is indicative of level of a process fluid in a container.

6. The process variable transmitter system of claim 1 wherein the first and second analog output stages comprise an operational amplifier connected to an output from respective first and second pressure sensors.

7. The process variable transmitter system of claim 6 wherein the operational amplifiers are further coupled to a reference voltage.

8. The process variable transmitter system of claim 1 wherein the processed output comprises a difference between the analog output signal from the first transmitter and the analog output signal of the second transmitter.

9. The process variable transmitter system of claim 8 wherein the analog processing stage comprises an differential amplifier.

10. The process variable transmitter system of claim 1 including at least one power connection from the second process variable transmitter to the first process variable transmitter configured to provide power to the first process variable transmitter.

11. The process variable transmitter system of claim 10 wherein the first process variable transmitter is powered with power from the two-wire process control loop.

12. The process variable transmitter system of claim 11 wherein the second process variable transmitter is powered with power from the two-wire process control loop.

13. A method of sensing a first pressure at a first location and a second pressure at a second location comprising:
  sensing a first pressure using a first pressure sensor at the first location with a first process variable transmitter;
  providing a first analog output signal based upon the first sensed pressure;
  sensing a second pressure at a second location spaced apart from the first location with a second process variable transmitter;
  providing a second analog output related to the second pressure;
  receiving, at the second location in the second process variable transmitter the first and second analog outputs and responsively generating a processed output based upon the first and second analog outputs; and
  applying a current level to a two-wire process control loop based upon the difference output.

14. The method of claim 13 wherein the first and second analog output signals are voltage signals.

15. The method of claim 13 wherein the processed output comprises a difference between the analog output signal from the first process variable transmitter and the analog output signal from the second process variable transmitter.

16. The method of claim 13 wherein the first and second pressure sensors have a capacitance related to applied pressure.

17. The method of claim 13 wherein electronic circuitry of the first and second process variable transmitters comprises radiation hard circuitry.

18. The method of claim 13 wherein the current level is indicative of level of a process fluid in a container.

19. The method of claim 13 including powering the first process variable transmitter with power from the second process variable transmitter.

20. The method of claim 19 including powering the first process variable transmitter with power from the two-wire process control loop.

* * * * *